United States Patent
Smith et al.

[15] 3,672,341
[45] June 27, 1972

[54] AIR POLLUTION-FREE INTERNAL COMBUSTION ENGINE AND METHOD FOR OPERATING SAME

[72] Inventors: Richard D. Smith, Palo Alto; Dale A. Furlong, Sunnyvale, both of Calif.

[73] Assignee: Combustion Power Company, Inc., Palo Alto, Calif.

[22] Filed: July 30, 1970

[21] Appl. No.: 59,571

Related U.S. Application Data

[63] Continuation-in-part of Ser. Nos. 796,089, Feb. 3, 1969, and Ser. No. 820,941, May 1, 1969.

[52] U.S. Cl..........................123/119 E, 123/25 R, 123/25 C, 123/119 R, 60/39.46
[51] Int. Cl...................F02d 19/00, F02b 33/00, F02c 3/20
[58] Field of Search......................123/32, 119 E, 25 R, 25 C, 123/1 A; 60/39.46

[56] References Cited

UNITED STATES PATENTS

| | | | |
|---|---|---|---|
| 3,101,592 | 8/1963 | Robertson | 123/119 E |
| 3,459,953 | 8/1969 | Hughes | 123/119 E |
| 3,490,422 | 1/1970 | Bullis | 123/32 |
| 3,572,297 | 3/1971 | Murray | 123/119 E |
| 883,240 | 3/1908 | Sabathe | 123/1 A |
| 1,275,481 | 8/1918 | Seymour | 123/119 E |
| 1,711,937 | 5/1929 | Glantz | 123/25 |
| 1,776,943 | 9/1930 | Douthit | 123/25 |
| 1,905,627 | 4/1933 | Holland | 123/119 E |
| 2,017,481 | 10/1935 | Von Opel | 123/119 E |
| 2,183,674 | 12/1939 | Erren | 123/276 AS |
| 2,487,126 | 1/1950 | Pitt | 123/25 |
| 2,496,623 | 2/1950 | Fragale | 123/119 E |
| 2,775,961 | 1/1957 | Petre | 123/119E |
| 2,960,834 | 11/1960 | Patrick | 123/119E |

FOREIGN PATENTS OR APPLICATIONS

| | | | |
|---|---|---|---|
| 831,429 | 12/1937 | France | 123/119 E |
| 736,486 | 8/1943 | Germany | 123/119 E |

*Primary Examiner*—Laurence M. Goodridge
*Assistant Examiner*—Ronald B. Cox
*Attorney*—Lawrence W. Flynn

[57] ABSTRACT

An air pollution-free internal combustion engine and method for operating such engine are provided in which the engine has at least one cylinder, an exhaust port and exhaust valve, fuel, oxygen gas and water spray injectors, a piston in the cylinder, means for cyclically opening and closing the exhaust valve, a fuel storage and supply system for feeding hydrogen gas or a liquid hydrocarbon to the fuel injector, an oxygen storage and supply system for feeding substantially pure oxygen to the oxygen gas injector, means for igniting the injected mixture of fuel and oxygen, and a water recovery system for recovering water from the exhaust discharged from the cylinder and for recycling the recovered water to the water spray injector.

In a typical engine cycle, the exhaust valve is closed prior to completion of the exhaust stroke to entrain some exhaust gas in the cylinder as a working fluid. Oxygen is then injected into the cylinder after the exhaust valve closes and before the piston reaches top dead center on the exhaust stroke, and while relatively low pressures exist in the cylinder. Fuel is next progressively injected under pressure into the oxygen contained in the cylinder so that that fuel burns progressively as it is injected to preclude knocking problems. After combustion is substantially completed, the exhaust valve opens just before the piston reaches bottom dead center on the power stroke whereupon water is injected into the cylinder to cool the cylinder walls, piston, dome, combustion chamber wall and exhaust gas. A portion of the exhaust gas is then discharged from the cylinder through the exhaust port on the exhaust stroke.

34 Claims, 12 Drawing Figures

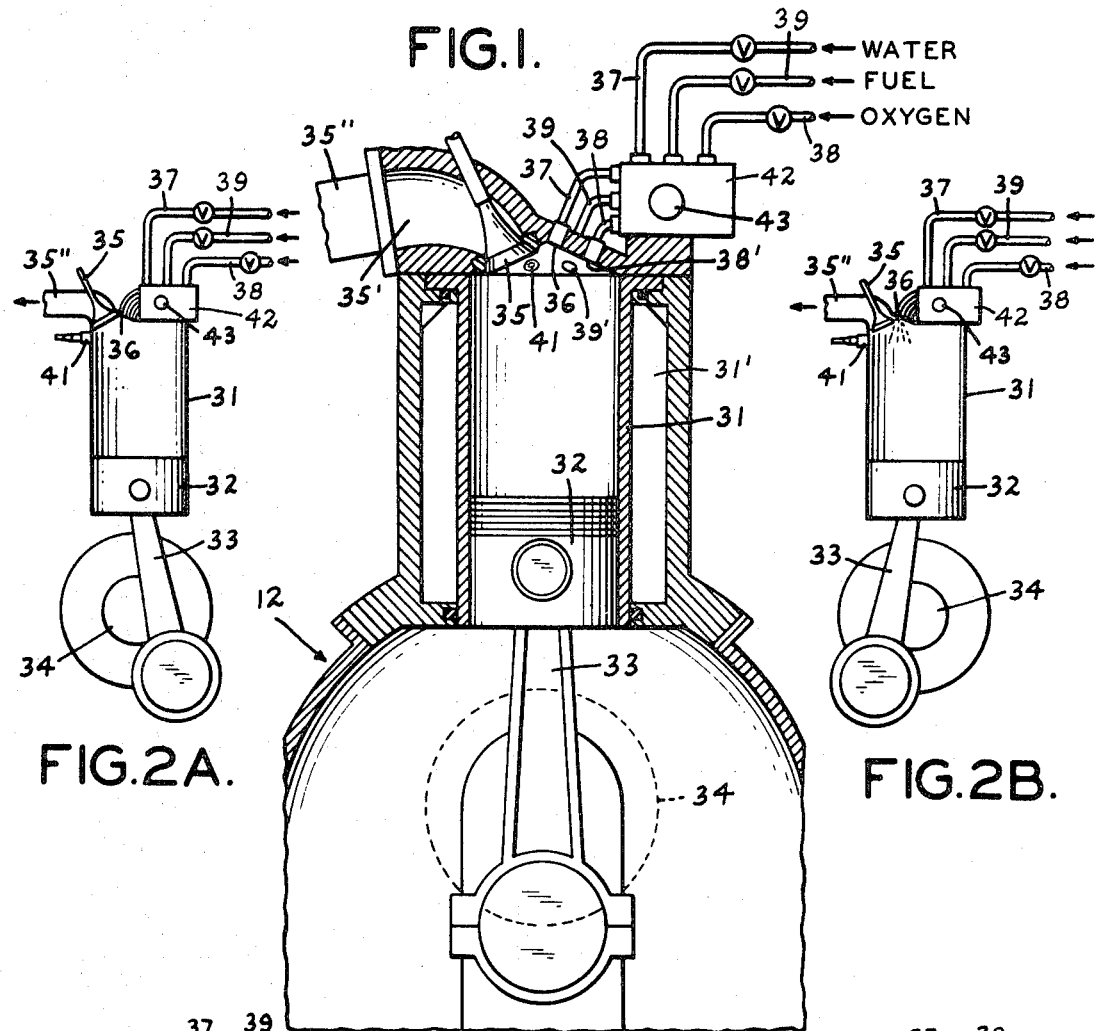
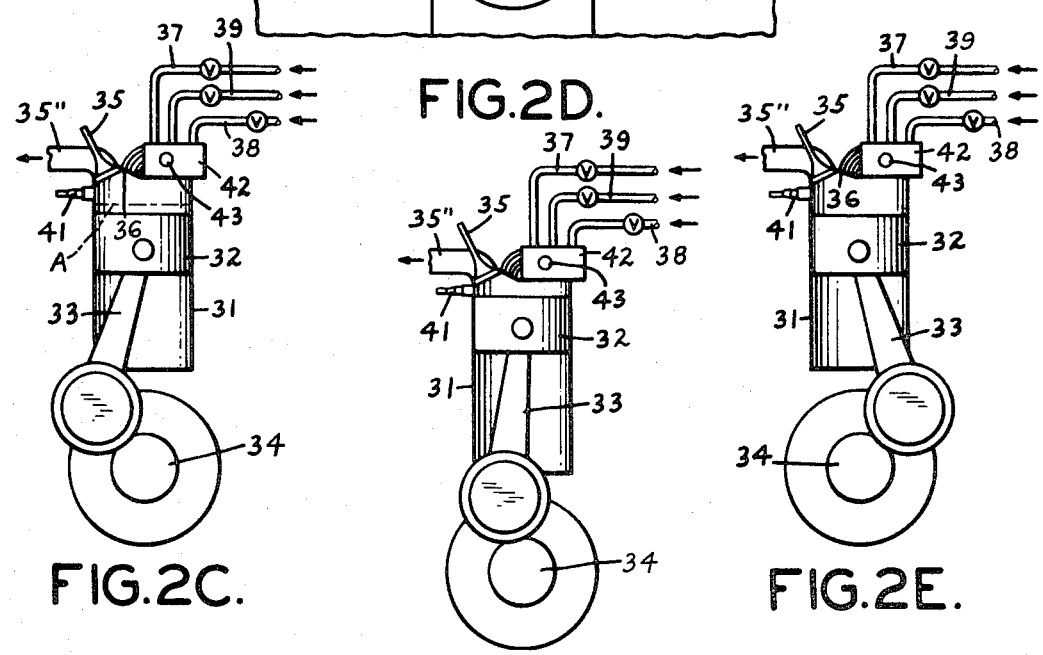

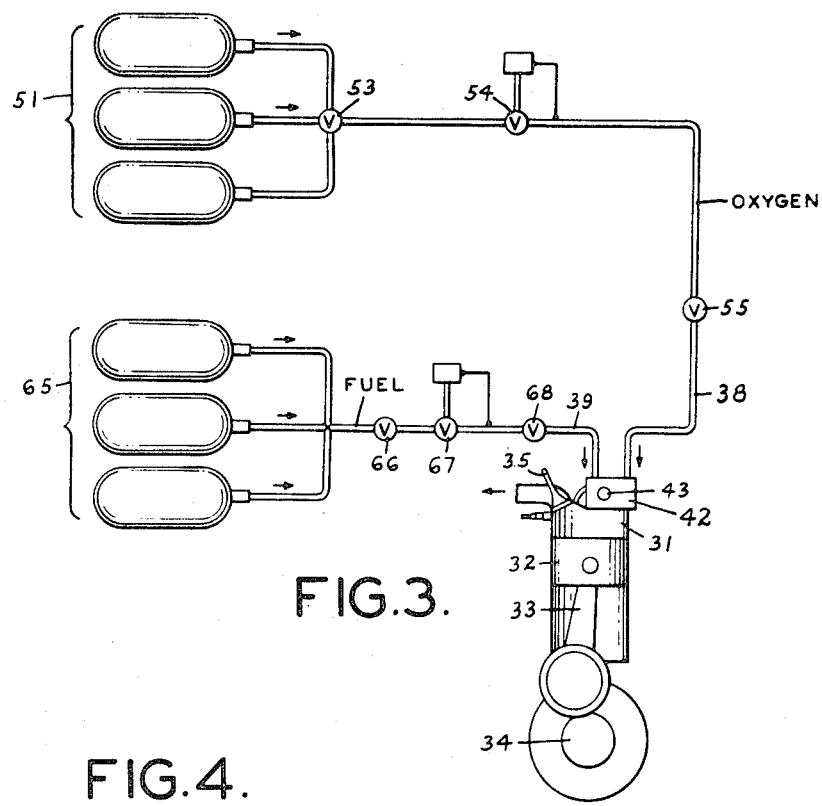
FIG. 3.
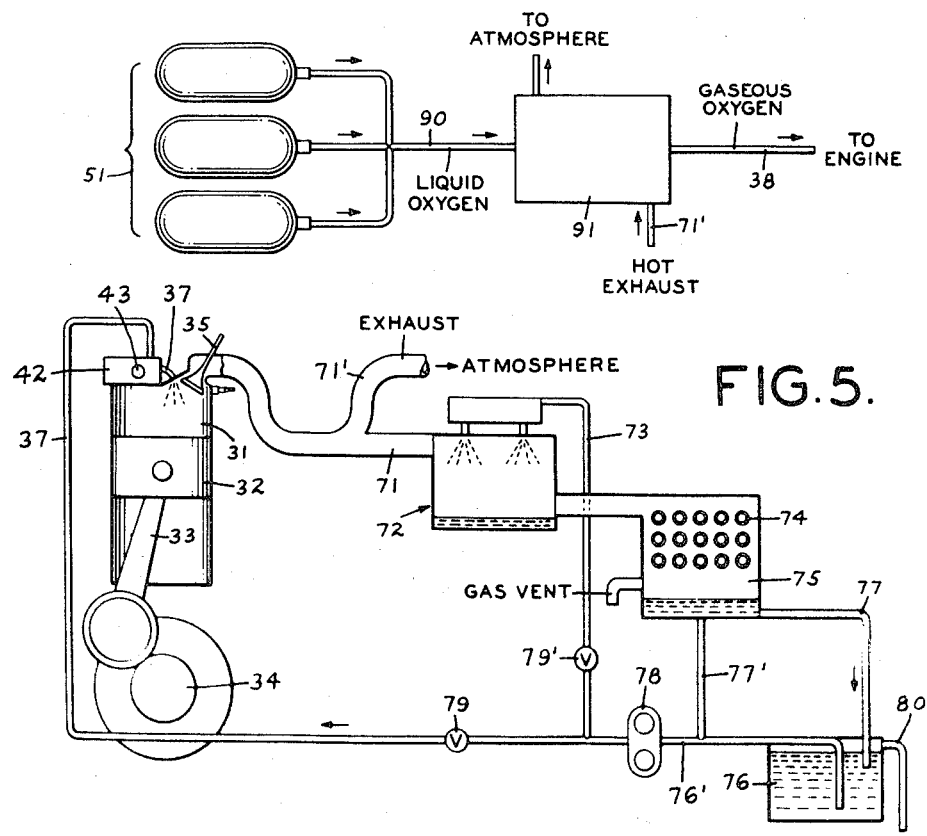
FIG. 4.
FIG. 5.

AIR POLLUTION-FREE INTERNAL COMBUSTION ENGINE AND METHOD FOR OPERATING SAME

CROSS REFERENCE TO RELATED APPLICATIONS

This application is a continuation-in-part application of U.S. applications, Ser. No. 796,089, filed Feb. 3, 1969 and Ser. No. 802,941, filed May 1, 1969, and relates to air pollution-free internal combustion engines and the method of the operating thereof and, more particularly, to internal combustion engines for use in vehicles such as automobiles, trucks, tractors, buses and the like.

BACKGROUND OF THE INVENTION

Air pollution is one of the most pressing problems facing industrial and population centers around the world today. The city dweller is being gradually poisoned with lethal doses of carbon monoxide, unburned hydrocarbons, and nitrogen oxides that pour from the exhausts of the internal combustion engines of millions of passenger cars, trucks, buses, and the like, that crowd the streets and highways in ever increasing numbers. Somewhere between 40 percent and 60 percent of the air pollution is caused by various forms of such exhaust products.

The three major approaches currently being pursued to provide an air pollution-free car are: (1) elimination of emissions from air breathing internal combustion engines by means of catalytic filters, fuel additives, engine design, etc.; (2) development of an external combustion engine (gas turbine, Stirling engine, steam engine) to replace the current internal combustion engine; and (3) development of an electric car to replace current cars.

The first approach is being vigorously pursued by automotive manufacturers and major oil companies because, if successful, it would require minimum change to the automobile as it is known today. Difficult technical problems are involved and long term laboratory research programs are anticipated. One of the most difficult problems in this approach is the elimination of oxides of nitrogens.

The external combustion engine approach requires compromises in performance, convenience, or economy compared to current automobiles. Such external combustion engines are expensive to develop and require drastic changes in the production tooling of the major automobile manufacturers. More importantly, however, such external combustion engines are not completely pollution-free.

Of the three approaches, the electric car is the only one completely pollution-free. Unfortunately, it is also the approach which requires the most research in order to provide a car that meets today's standards of performance, comfort, and convenience.

SUMMARY OF THE INVENTION

The present invention is directed to an air pollution-free internal combustion engine and automobiles powered thereby and method of operating the same wherein the engine includes at least one cylinder, a piston reciprocating in the cylinder, an exhaust valve and exhaust port in said cylinder and inlet injectors opened and closed cyclically as the piston reciprocates. The inlet injectors include a fuel supply inlet, a nitrogen free oxidant inlet, and a water inlet. Means are provided to ignite the injected mixture of fuel and oxidant to produce combustion. Steps and means are also provided for supplying the controlled amounts of fuel and oxidant from storage receptacles to the cylinder and for injecting the fuel and oxidant into the cylinder to produce substantially complete combustion therein. The engine contains as an additional feature means for water spraying the cylinder, piston and exhaust gases during the exhaust cycle. The engine fuel is either gaseous hydrogen or a liquid hydrocarbon such as diesel fuel or gasoline; the nitrogen free oxidant for both fuels is oxygen in a substantially pure form.

In a typical engine cycle, the exhaust valve is closed prior to completion of the exhaust stroke of the piston to entrap a limited amount of exhaust gas in the cylinder as a working fluid. After the exhaust valve closes and prior to the piston reaching top dead center, a metered amount of substantially pure oxygen gas is injected into the cylinder while relatively low pressures exist in the cylinder. Sufficient oxygen is injected to provide at least the stoichiometric amount required in the oxygen-fuel combustion reaction. Excess oxygen can also be injected to insure substantially complete combustion. After the oxygen is injected, metered amounts of fuel are progressively injected under high pressure into the oxygen contained in the cylinder. A glow plug or other suitable igniting device is positioned in proximity to the fuel injector to produce combustion of the fuel and oxidant. The fuel is injected in a manner which insures the progressive burning of the fuel as it is injected. Fuel injection occurs in a manner similar to that of a diesel engine. When combustion is substantially completed, the exhaust valve opens and water is injected during the exhaust stroke to cool the cylinder walls, piston, dome, combustion chamber and exhaust gas by vaporization of the water into steam. The injected water, it should be noted, produces no substantial cooling of the hot gas during the combustion and expansion steps.

The water contained in the exhaust gas can be conveniently condensed and recycled to the water injectors. In the case where the oxidant supply is one or more tanks of cryogenic liquid oxygen, it becomes convenient to derive the heat required to vaporize the oxygen by employing the liquid oxygen to condense the water in the exhaust gas for recycle. The heat can also be derived from the hot exhaust gas itself.

The engine of this invention will operate at near stoichiometric temperatures because the copious amounts of nitrogen which are injected when air is the oxidant are not present and therefore there is no nitrogen to heat, only the products ($CO_2$ and $H_2O$ of combustion plus any excess oxygen. Fuel vaporization will proceed rapidly due to the high flame temperature and the resultant high rate of heat transfer to the fuel droplets.

Because the fuel will be injected into an environment which has approximately three times the oxygen concentration of air, fuel molecules will easily find oxygen molecules to produce rapid and complete combustion. In addition to the oxygen rich environment in the cylinder, the high flame temperature will in itself promote high reaction rates. As a result of the above, unburned hydrocarbons and carbon monoxide should not be present in the exhaust. These rapid reaction rates could cause detonation and knocking problems in a conventional otto cycle engine. Here, in the engine cycle of this invention, the fuel is progressively injected and burns progressively. In such a situation, the high reaction rates favor smooth operation because they preclude accumulations of unburned fuel. This progressive burning of the fuel permits the use of hydrocarbon fuels which are free from polluting anti-knock additives such as the various lead anti-knock compounds.

Burning fuel in a gas with a high concentration of oxygen produces many benefits with complete combustion and high thermal efficiency being the most important. The very high temperatures also transmit greater quantities of heat to the walls of the combustion chamber and to the piston. The limiting conditions in the cylinder are the walls of the combustion chamber, which must remain at approximately 450° F. or below to keep the oil film from breaking down. To accomplish this, water spray is injected into the cylinder during the exhaust stroke portion of the cycle to cool the piston, cylinder, and gaseous contents thereof. The spray contacts the surface of the chamber walls, and head of the piston. Heat transfer by this means is highly efficient because the heat need not be transferred through the chamber walls. The water spray also cools the exhaust gases remaining in the chamber. In addition to the water spray cooling, the normal cooling methods of the stock engine will be employed.

It will be appreciated that the engine of this invention can be utilized for many purposes and is ideally suited for propelling an automobile and, in combination with other aspects of the present invention, provides an air pollution-free system of vehicular travel. Therefore, the embodiment of the invention will be described in greater detail below as applied to an internal combustion engine for an automobile and the operational system for such engine and automobile.

Under present day driving habits, the ideal engine for the family sedan should provide maximum efficiency in the horsepower range of about 25 to 50 horsepower yet be capable of a maximum power of 200 horsepower and torque of 250 lb.-feet. A family car with such an engine requires an energy storage of about 134 horsepower hours delivered to the wheels. These requirements are difficult to meet with conventional 4-stroke gasoline engines because the maximum power output of such conventional 4-stroke gasoline engine is directly proportional to the weight flow of air. Therefore, at any given engine speed, power and torque are increased by increasing the displacement of the engine. Consequently, conventional 4-stroke engines used in family cars tend to have rather large displacements in order to meet the maximum power requirements; 300 cubic inches is considered normal today. When these engines are operated at 25 to 50 horsepower, which is the normal range at the more common driving speeds and only a fraction of maximum power, maximum gas temperatures and pressure in the cylinders are reduced greatly because of heat transfer to the large surface area within the combustion chamber. Thermal efficiency and engine efficiency at normal driving speeds is thereby sacrificed. Combustion efficiency of such engine is also sacrificed and air pollution is substantially increased.

In the engine in accordance with the instant invention, high efficiency is accomplished in the more common driving speed range of 25–50 horsepower with a 2-stroke engine which is less than one-third the size of an equivalent conventional 4-stroke gasoline engine of the type currently used in automobiles. Because of the reduction in size, the reduction in the number of strokes, and increase in cylinder pressure during normal, or cruise operation, the thermal efficiency and engine efficiency are substantially improved over conventional 4-stroke engines. The instant 2-stroke engine can, however, be produced with internal combustion tooling now in use for producing conventional 4-stroke gasoline engines.

It is an object of this invention to provide an engine which is air pollution-free. With hydrogen as the fuel, the only production of combustion is water and with a liquid hydrocarbon fuel such as gasoline, the products of combustion are water, carbon dioxide and other nonpollutants.

It is another object of this invention to provide an engine which can be produced with existing manufacturing technology and achieves current standards for performance, convenience, and economy. No unusual starting or warm-up problems are introduced and periodic maintenance remains substantially unchanged. Once in production, cars with internal combustion engines of the instant invention will cost approximately the same as family cars with conventional internal combustion engines and trips to the gas station will be of equivalent frequency and cost.

It is another object of the present invention to provide a pollution-free engine whereby water is recovered from the engine exhaust and recycled for water spray cooling the cylinder, pistons and exhaust gas during the exhaust stroke. A feature and advantage of the invention lies in the fact that water is the major combustion product of the fuel. Cooling fluids for water spray may thus be provided without requiring excessive fluid storage in the car. Such cooling fluids are regenerated during operation.

It is a further object of this invention to substantially eliminate undesirable knocking typically encountered in presently used internal combustion engines which employ a gasoline fuel. This results in the elimination of polluting antiknock additives from the fuel source due to the progressive burning of the injected fuel.

It is a still further object of this invention to provide an engine whereby fuel is injected into an oxygen rich environment which enhances the probability of a reactive collision between oxygen and fuel molecules thereby improving the efficiency of the combustion reaction.

These and other objects and advantages of this invention will become more apparent when reading the following description and referring to the accompanying drawing in which similar characters of reference represent corresponding parts in each of the several views.

BRIEF DESCRIPTION OF THE DRAWINGS

FIG. 1 is an elevational sectional view of a portion of one cylinder of an air pollution-free engine in accordance with the present invention in which, in one embodiment, the engine is operated with hydrogen-oxygen, in another embodiment, with gasoline-oxygen, and in a further embodiment with diesel fuel-oxygen.

FIGS. 2A–2E are schematic elevational views of the engine operation in accordance with the present invention illustrating the operating cycle of the engine.

FIG. 3 is a schematic illustration of the gas supply system for an engine in accordance with the present invention.

FIG. 4 is a drawing schematically illustrating vaporization of cryogenic liquid oxygen by contact with the hot exhaust gas.

FIG. 5 is a drawing schematically illustrating the water spray and water recovery system of the present invention.

DESCRIPTION OF THE PREFERRED EMBODIMENTS

Figure 6:
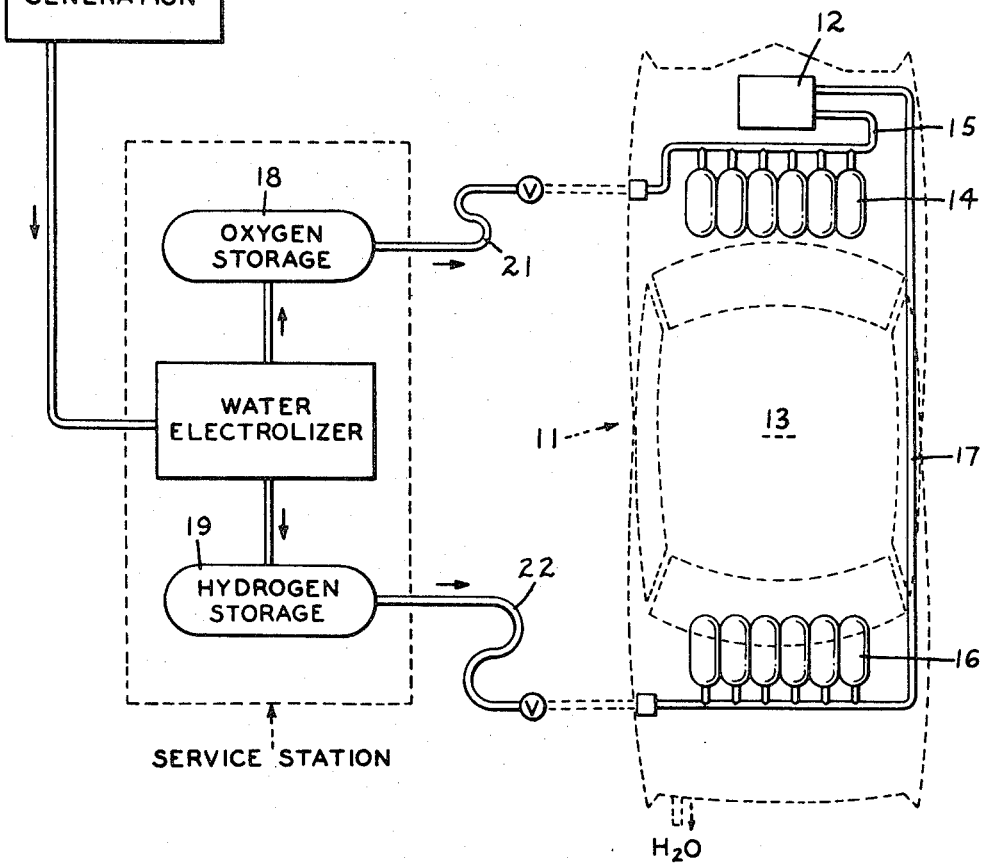
FIG. 6 is a schematic view, partially in block diagram form and partially in plan, schematically illustrating the adaption of the hydrogen-oxygen embodiment to an automobile.

For purpose of illustration, the instant invention is applied to a 2-stroke engine having four in-line cylinders each connected by a connecting rod to a common crank shaft. The engine includes a conventional coolant jacket, coolant pump, ignition distribution system, exhaust valve and, except as hereinafter noted, conventional accessories and timing mechanisms.

Referring to FIG. 1, showing one cylinder of the 2-stroke, four cylinder, in-line engine illustrating the instant invention, each cylinder has a bore of 2.6 inches and a stroke of 4 inches. The exhaust is removed from cylinder 31 through single overhead valve 35 via exhaust port 35' and exhaust manifold 35'' with valve 35 operated by an overhead cam driven in conventional manner, not shown. With an expansion ratio of 20:1, the volume of each combustion chamber is 1.04 cubic inches. The engine, generally designated 12, uses the crankshft from a conventional internal combustion engine having a 4-inch stroke. The water injector 36, oxygen injector 38, fuel injector 39 and a glowplug 41 are all located in the head. Water injector 36 is centered in the bore to provide a uniform spray to piston 32 and the walls of cylinder 31. Water, fuel and oxygen are metered by valve 42 driven by an auxiliary cam on shaft 43 in turn driven in conventional manner, not shown, from crankshaft 34. The fuel metering valve is separated from the oxygen metering valve to provide complete separation of the materials until injection into the combustion chamber. A typical engine constructed in accordance with the present invention is 27 inches long, 25 inches high, 15 inches wide, and weighs approximately 220 pounds.

In one embodiment of the invention, hydrogen gas is used as a fuel and oxygen gas is used as the oxidant. In another embodiment a liquid hydrocarbon such as diesel fuel or gasoline is used as the fuel and oxygen gas as the oxidant. Because, as will be described in more detail hereinbelow, the hydrogen and oxygen gases are at sufficient pressure, such gases are delivered from the respective storage tanks to throttling valves and metering valves driven by the auxiliary cam on shaft 43 through appropriate lines connected to the respective storage tanks. When liquid gasoline is used as the fuel, the gasoline is pumped from the storage tank, which is at atmospheric pressure, to throttling and metering valves, the pump providing sufficient pressure so that the liquid gasoline, in the required amount, can be injected into the cylinder. For this purpose, a pump driven in conventional manner from crankshaft 34 and having suitable throttling and metering means may be employed. Similarly, such a pump is also employed for feeding the water at sufficient pressure for spray cooling each cylinder.

Referring now to FIGS. 2A-2E, there is illustrated a typical cycle of the engine in accordance with the embodiment of the invention in which hydrogen gas is employed as the fuel and substantially pure oxygen gas as the oxidant. With particular reference to FIG. 2A, there is shown one of the engine cylinders 31 including a working member or piston 32 therein connected via connecting rod 33 to drive shaft 34. The piston 32 is illustrated near the end of the power stroke after combustion of gaseous hydrogen and substantially pure oxygen. The products of combustion and the working fluid (both superheated water vapor) have been expanded, such as 20:1, and the exhaust valve 35 is about to open.

The exhaust valve 35 opens just before bottom dead center and the hot gas in the cylinder blows down to low pressure, the gas in the cylinder expanding adiabatically. Shortly after the blowdown of the superheated vapor in the cylinder, water injection is initiated through injector 36 to cool the cylinder walls, pistons, and exhaust valve (see FIG. 2B). The exhaust valve 35 is left open during a portion of the exhaust stroke to permit discharge of a portion of the exhaust gas out port 35''. During this exhaust portion of the stroke, the piston 32 has scavenged the majority of the high temperature vapor from the cylinder. Some of the vapor will be cooled directly by vaporizing the injected water as it is sprayed toward the wall. The water hitting the walls, piston crown, and exhaust valve will flash into low temperature steam, mixing with the residual high temperature water vapor and cooling it further. Some of this steam will pass out the exhaust valve along with the residual vapor.

Exhaust valve 35 is closed (see FIG. 2C) prior to completion of the exhaust stroke to entrain a limited amount of exhaust gas in the cylinder as a working fluid. Typically, the exhaust valve is closed when the piston has reached a position where only about 5:1 volume ratio remains. At the time the exhaust valve is closed, the volume remaining above the piston in the cylinder is filled with saturated steam.

At the time of closing the exhaust valve 35, injection of substantially pure gaseous oxygen from injector 38 is initiated (see FIG. 2C). This injection occurs between closing of the exhaust valve and prior to the piston reaching top dead center and while relatively low pressures, e.g., less than about 300 psia, exist in the cylinder. Approximately 15 percent excess oxygen is preferably injected at this point to assure complete combustion.

Fuel injection is initiated after a substantial amount of the metered amount of oxygen has been injected so that the fuel is progressively injected into the oxygen rich environment existing within the cylinder. Fuel injection is initiated after oxygen has been injected (as shown in FIG. 2C) but prior to the cylinder reaching top dead center on the exhaust stroke. The position of the piston upon initiation of fuel injection is schematically shown by dotted line A in FIG. 2C. This oxygen rich environment into which the fuel is injected enhances the probability of a fuel molecule colliding with an oxygen molecule to produce more efficient combustion. The fuel is injected in proximity to a hot glow plug 41 which produces ignition of the oxygen-fuel mixture at top dead center (see FIG. 2D). The fuel is injected under high pressure in excess of that existing in the cylinder. During fuel injection, the pressure in the cylinder can typically vary from about 300 to 1,300 psia.

The resulting combustion occurs primarily in a zone surrounding the fuel injector 39' and produces a gradual and progressive burning of the fuel which results in substantially eliminating knocking within the engine.

It is not essential that the entire fuel requirement be injected prior to the cylinder reaching top dead center; the remaining portion of the fuel can, of course, be injected after the piston has reached top dead center and begun its downward power stroke as shown in FIG. 2E.

FIG. 2D shows ignition at top dead center of the exhaust stroke where combustion begins and increases the pressure and temperature in the cylinder. Next, the superheated vapor is expanded 20:1 in the power stroke to provide the work output (see FIG. 2E). The superheated vapor transfers heat to the walls which, in addition to cooling by the water jacket 31' are also cooled by the internal water spray on the exhaust upstroke. When the cylinder reaches bottom dead center (FIG. 2A) the cycle begins anew with initiation of the upward exhaust stroke.

In accordance with another embodiment of the invention, a liquid hydrocarbon fuel such as diesel fuel or gasoline, rather than hydrogen, are combusted with substantially pure oxygen to provide a 2-cycle internal combustion engine in which the maximum efficiency is in the 25-50 horsepower range yet such engine is capable of maximum power of 200 horsepower and 250 lbs.-ft. of torque. For purposes of comparison, the engine in accordance with this embodiment is designed with the same displacement, bore and stroke as the air pollution-free engine utilizing hydrogen and oxygen described above. The engine burning diesel fuel or gasoline and oxygen operates basically on the same cycle as the hydrogen and oxygen burning engine but derives its pollution-free potential from completely oxidizing the hydrocarbons in the fuel in the absence of nitrogen. Consequently, oxygen rich mixtures can be used to thoroughly oxidize the fuel without the usual production of nitrogen oxides as in the case in conventional engines where air is employed.

The operation of the engine in accordance with this embodiment conforms generally to the operation described above with reference to FIGS. 2A-2E but wherein liquid diesel fuel or gasoline instead of gasoline hydrogen is directed into the cylinder through line 39. The liquid fuel is burned in a gas mixture with a high oxygen concentration and, typically, with 15 percent excess oxygen. As a result, at the end of the combustion stroke, as shown in FIG. 2A, the hydrocarbons of the fuel are completely oxidized to water and carbon dioxide.

As with the engine burning hydrogen and oxygen, all of the oxygen is introduced prior to ignition after which hydrogen is injected into the oxygen rich environment in the cylinder to produce efficient combustion.

In this gasoline-oxygen embodiment of the invention, the hydrocarbon fuels are burned substantially completely to eliminate air polluting carbon monoxide, unburned hydrocarbon and nitrogen oxides normally resulting from the use of gasoline and air in internal combustion engines. The production of nitrogen oxide is not possible in the instant invention because the element nitrogen is not present in the cylinder. Furthermore, when the gasoline is burned in the highly concentrated oxygen environment of this invention, intimate contact between the gasoline molecules and the oxygen molecules is accomplished. Compared to the combustion of the same fuel in air, the burning rate is increased, the temperature of the products of combustion is higher, and thoroughness of combustion of the fuel is assured.

Referring to FIG. 3, there is shown a schematic diagram of the storage and injection system for the oxygen gas for the engine of the present invention. The oxygen gas is stored initially in storage tanks at a pressure in excess of the injection pressure. The gas injection system of the illustrative embodiments utilizes the lowest possible gas injection pressure to take maximum advantage of the capacity of the storage tanks. If the pressure drops below the gas injection pressure, the engine begins to lose power, thereby warning the driver to stop at a service station and recharge the tanks.

As shown in FIG. 3, oxygen is stored in a plurality of interconnected storage tanks 51. The oxygen injector line 38 provides communication between tanks 51 and cylinder 31. The oxygen is typically stored at a working pressure of about 5,000 psia. Line 38 contains a shutoff valve 53, a pressure reducing regulator 54 to reduce the oxygen pressure to a relatively low pressure sufficient to inject it into the cylinder, and a throttle valve 55. Shutoff valve 53 is actuated by the ignition key of the automobile. At the engine, the oxygen passes through throttling valve 55 controlled by the automobile accelerator (not shown) and a metering valve 42 driven by shaft 43 to inject oxygen into the cylinder at the proper time of the cycle.

The hydrogen storage and injection system for the embodiment of the invention utilizing hydrogen gas as the fuel is also shown in FIG. 3 and is similar to the oxygen system. It includes a plurality of interconnected pressure tanks 65, a shutoff valve 66, a pressure reducing regulator 67, and a throttle valve 68. The throttling valve 68 and the hydrogen metering valve 42 are operated and controlled in a manner similar to the oxygen throttling and metering valves.

As an alternative to high pressure storage of oxygen gas, the oxygen can be stored as cryogenic liquid oxygen in properly insulated tanks in an arrangement similar to that shown in FIG. 4. In this case, it becomes necessary to provide means for vaporizing the oxygen prior to its injection into the cylinder. This heat required to accomplish vaporization can be recovered from the exhaust gas of the engine as shown schematically in FIG. 4, by passing the stream of liquid oxygen 90 and the exhaust stream 71' through a conventional heat exchanger 91 wherein the heat in the exhaust is used to vaporize the liquid oxygen. The vaporized oxygen is then directed to the engine through injector line 38 which will include suitable conventional valving (not shown in FIG. 4) as required.

In another embodiment, liquid oxygen can be vaporized by using it as the cooling fluid in condenser 75 of the exhaust gas water recovery system as discussed in greater detail hereinbelow. In this case, the heat of vaporization given up when the water is condensed by the cold liquid oxygen is used to vaporize the liquid oxygen.

Referring to FIG. 5, water for internal water spray cooling of the cylinder walls, piston, dome, combustion chamber wall and exhaust gas is provided by condensing the water vapor of the working fluid and cooling spray emanating from exhaust port 35'. Exhaust manifold 35" is connected, by line 71, to the top of desuperheater 72, connected near its bottom to condenser 75. Because the amount of water for water spray cooling is less than the amount of water vapor exhausted through exhaust valve 35 and manifold 35", a part of the exhaust may be discharged, through line 71', to the atmosphere. Water or coolant from the radiator and coolant system of engine 12 is circulated through coil 74 in condenser 75. Optionally, liquid oxygen from storage tanks 51 can be circulated through coil 74 as discussed hereinabove to vaporize the liquid oxygen prior to its injection into cylinder 31.

Water condensed from the exhaust in condenser 75 is discharged through line 77 into reservoir 76, having an overflow conduit 80 for discharging excess water to the atmosphere and, through line 77', to line 76' connected, at one end, to reservoir 76 and, at its other end, to pump 78. From pump 78 the water is fed, through throttle valve 79, to water spray injector 36, and, through valve 79' and line 73, to the spray head in desuperheater 72. Desuperheater 72, condenser 75, reservoir 76, pump 78 and the various lines, are provided with small vents so that, after the engine is shut-down, any water remaining in the system will be discharged to the atmosphere. In this way, freezing of the system is avoided where atmospheric temperature is below freezing and the engine is shut down for any extended period of time. In the illustrative embodiments, sufficient water is sprayed into each cylinder on each exhaust stroke to cool the cylinder walls, piston, dome, combustion chamber walls, and exhaust gas. Such water is injected into cylinder 31, through spray head 36, FIG. 1, as a medium fine spray. If too fine, the spray will be evaporated and will not reach the cylinder wall and piston crown for cooling. If too coarse, the spray will not distribute uniformly on the cylinder walls. Preferably, only nominal pressures, such as 120 psia, are employed at the water spray nozzle. The amount of water to be sprayed is controlled by valve 79, FIG. 5. The water is not injected into the cylinder in order to cool the hot gas during combustion and expansion and thereby lower the temperatures to which the piston and cylinder walls are subjected during the combustion as occurs in various previously described internal combustion engines. Instead, maximum combustion temperatures are permitted to occur in order to produce a high efficiency, high output engine. The water is injected after combustion is substantially complete to quickly cool the portions of the engine whose temperature has been elevated by the heat transferred to them by the hot combustion gases.

With the exhaust recovery system of the instant invention for recovery of water from the engine exhaust, the need for water storage for internal water spray cooling of the cylinders and pistons is avoided. When the engine is first started, the cylinder walls, pistons, engine coolant temperature and elements of the exhaust recovery system are at a relatively low temperature. Thus, when the engine is first started, internal water spray coolant is not required but is required only after the cylinder walls and pistons heat-up. While this heating up is taking place, the water vapor from the exhaust is being condensed and collected in the recovery system so that, when required for water spray cooling of the cylinder walls and pistons and for spraying in desuperheater 72, water will be available in reservoir 76. If, of course, the engine is shut down and restarted before the cylinder walls, pistons and recovery system has cooled down, the water remaining in the recovery system from the earlier engine operation is available for immediate water spray in the cylinders through spray injector 36.

The engine of the instant invention, whether the embodiment in which the fuel is hydrogen or a liquid hydrocarbon, may be installed in the front or rear of the automobile, depending upon the automobile design, and is coupled to the drive gear in conventional manner as, for example, by a conventional transmission, torque converter, or the like. The storage tanks, whether containing hydrogen and oxygen gases, or a liquid hydrocarbon and oxygen gas, are located in the vehicle at a convenient location, where they are out of the way, and can be conveniently filled. Preferably, however, the tanks are located at separate locations in the vehicle in the interest of safety.

Figure 7:
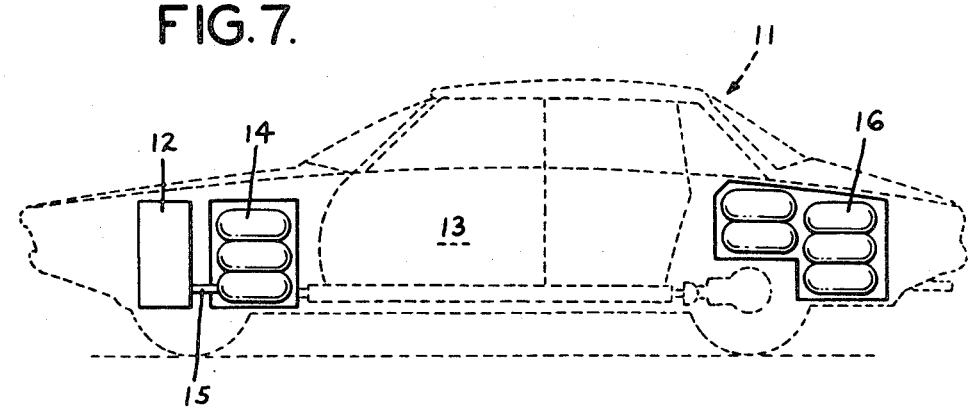
FIG. 7 is a schematic elevational view of the automobile illustrated in FIG. 6.

Referring now to FIGS. 6 and 7, a 2-stroke internal combustion engine 12 is located in the front of passenger compartment 13 of the vehicle, generally designated 11. In this embodiment, combustion fuel for engine 12 is provided from hydrogen tanks 16 located at the rear of compartment 13 and connected to engine 12 by line 17; oxidant is supplied from oxygen tanks 14 located at the front of passenger compartment 13 and connected to engine 12 by line 15. Oxygen tanks 14 are refilled or recharged from an oxygen storage tank, such as tank 18 at a service station, through line 21 having a quick connect coupling for connection to a suitable fitting on the vehicle; hydrogen tanks 16 are refilled or recharged in a similar manner from hydrogen storage tanks 19 through line 22.

Figure 8:
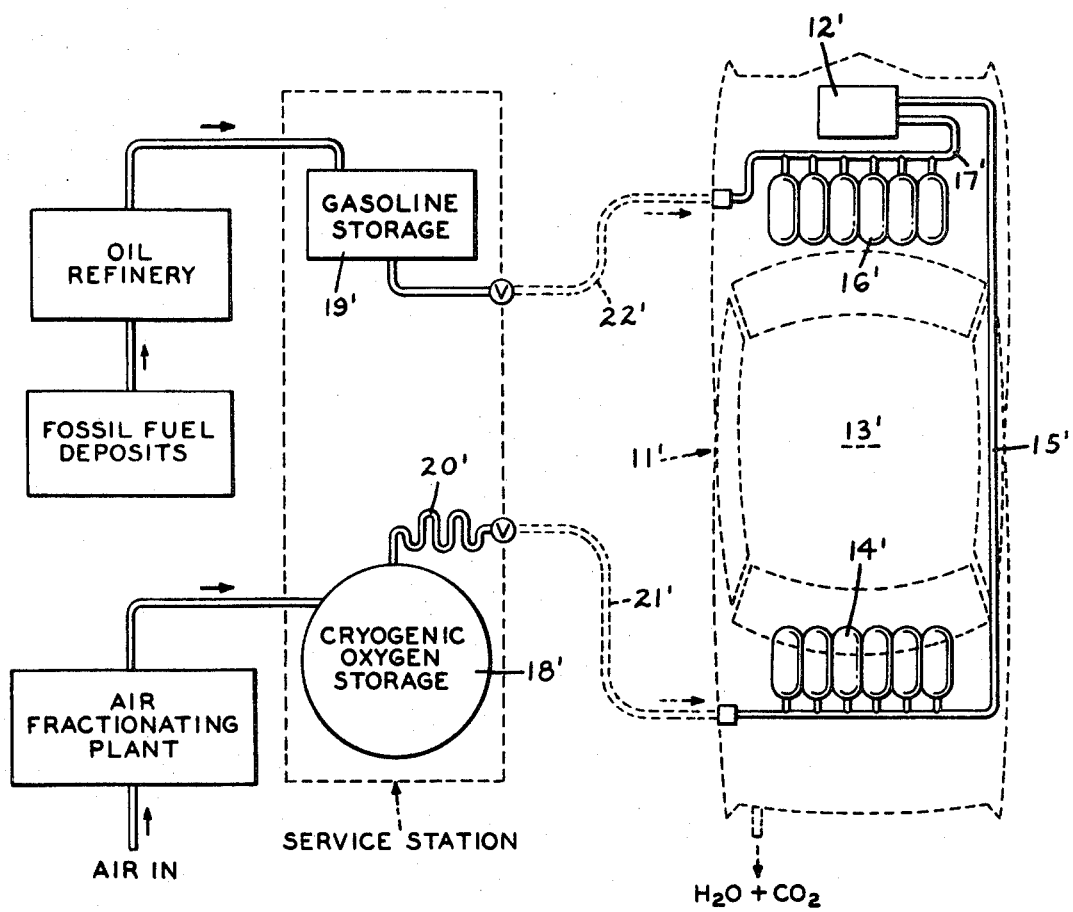
FIG. 8 is a schematic view, partially in block diagram form and partially in plan schematically illustrating the adaption of the gasoline-oxygen embodiment to an automobile.

In FIG. 8, the embodiment of the invention in which gasoline is used as the fuel and oxygen as the oxidant of the 2-stroke internal combustion engine of the instant invention is shown adapted to a passenger vehicle. Engine 12' is located in front of passenger compartment 13' and combustion fuel is delivered to engine 12' from gasoline tank 16' through line 17'. Gasoline tanks 16' and engine 12' are located at the front of passenger compartment 13'. Oxygen tanks 14' are located at the rear of compartment 13' and are connected by line 15' through engine 12'. Gasoline tanks 16' are refilled from gasoline storage tank 19', located at the service station, through line 22' in the manner conventionally employed for the fueling of passenger vehicles with conventional 4-stroke gasoline engines. Oxygen gas for refilling oxygen tanks 14' on the vehicle is fed from liquid oxygen storage tanks 18', located in the service station, through converter 20' and line 21'. A suitable quick connect coupling is provided on the vehicle and on the end of line 21' for feeding the oxygen from converter 20' to oxygen tanks 14' and for closing off the connection, at the vehicle, when the end of line 21' is removed from the vehicle connection. In the gasoline-hydrogen embodiment just described, the gasoline can be replaced by diesel fuel.

The terms and expressions which have been employed are used as terms of description and not of limitation, and there is no intention in the use of such terms and expressions of excluding any equivalents of the features shown and described or portions thereof, but it is recognized that various modifications are possible and are contemplated to fall within the scope and spirit of the claims appended hereto.

What is claimed is:

1. An air pollution-free internal combustion engine comprising:
   1. a least one cylinder;
   2. a piston reciprocating in said cylinder;
   3. an exhaust port in said cylinder;
   4. an exhaust valve in said port;
   5. a fuel injector in said cylinder;
   6. an oxygen injector in said cylinder for injecting substantially pure oxygen gas as the sole combustion oxidant;
   7. a water spray injector in said cylinder;
   8. means for supplying a metered amount of fuel to said fuel injector;
   9. means for supplying substantially pure oxygen to said oxygen inlet injector in a metered amount at least sufficient for complete combustion of said metered amount of fuel;
   10. means for supplying water to said water spray injector in a metered amount sufficient to cool the cylinder walls, piston, dome, combustion chamber wall and exhaust gas by vaporization of the water;
   11. means for cyclically opening the exhaust valve in said exhaust port and then closing the exhaust valve in said exhaust port prior to the completion of the exhaust stroke to entrain a limited amount of exhaust gas in the cylinder as a working fluid;
   12. means for injecting said metered amounts of oxygen into said cylinder after closing of the exhaust valve prior to the piston reaching top dead center and while relatively low pressures exist in the cylinder;
   13. means for injecting said metered amounts of fuel into said cylinder under high pressure, after injection of the oxygen, such that the fuel burns progressively as it is injected;
   14. means for igniting the injected mixture of fuel and oxygen to produce combustion; and
   15. means of injecting said metered amounts of water into said cylinder only during the exhaust stroke to cool the cylinder walls, piston, dome, combustion chamber wall and exhaust gas, without causing substantial cooling of the hot gas during combustion and expansion.

2. The engine of claim 1 wherein said fuel is a liquid hydrocarbon.

3. The engine of claim 2 wherein said liquid hydrocarbon is selected from the group consisting of gasoline and diesel fuel.

4. The engine of claim 1 further including oxygen and fuel storage means and means for supplying oxygen and fuel in metered amounts, from said oxygen and fuel storage means to said oxygen and fuel injectors, respectively.

5. The engine of claim 4 wherein said oxygen storage means comprises a plurality of interconnected storage tanks of high pressure oxygen gas.

6. The engine of claim 5 wherein said fuel is hydrogen and wherein said fuel storage means comprises a plurality of interconnected storage tanks of high pressure hydrogen gas.

7. The engine of claim 5 wherein said oxygen storage means comprises a plurality of interconnected insulated storage tanks containing therein liquid oxygen and further including means for vaporizing said liquid oxygen, said means for vaporizing disposed between said tanks and said oxygen injector.

8. The engine of claim 7 wherein said fuel is hydrogen and wherein said fuel storage means comprises a plurality of interconnected storage tank of high pressure hydrogen gas.

9. The engine of claim 4 wherein said fuel is a liquid hydrocarbon.

10. The engine of claim 9 wherein said oxygen storage means comprises a plurality of interconnected storage tanks of high pressure oxygen gas.

11. The engine of claim 9 wherein said oxygen storage means comprises a plurality of interconnected insulated storage tanks containing therein liquid oxygen and further including means for vaporizing said liquid oxygen, said means for vaporizing disposed between said tanks and said oxygen injector.

12. An air pollution-free internal combustion engine comprising:
   1. at least one cylinder;
   2. a piston reciprocating in said cylinder;
   3. an exhaust port in said cylinder;
   4. an exhaust valve in said port;
   5. a fuel injector in said cylinder;
   6. an oxygen injector in said cylinder for injecting substantially pure oxygen gas as the sole combustion oxidant;
   7. a water spray injector in said cylinder;
   8. fuel storage means;
   9. oxygen storage means;
   10. means for feeding fuel from said fuel storage means to said fuel injector in a metered amount;
   11. means for feeding oxygen from said oxygen storage means to said oxygen injector in a metered amount at least sufficient for complete combustion of said metered amount of fuel;
   12. means connected to said exhaust port for recovering water from the exhaust gas of the combustion of said fuel and oxygen in said cylinder, said exhaust gas discharged from said cylinder through said exhaust port to said means for recovering water;
   13. means for supplying the water recovered from said exhaust gas by said means for recovering water to said water spray injector in a metered amount sufficient to cool the cylinder wall, piston, dome, combustion chamber wall, and exhaust gas by vaporization of the water;
   14. means for cyclically opening the exhaust valve in said exhaust port and then closing the exhaust valve in said exhaust port prior to the piston reaching top dead center and while relatively low pressure exist in the cylinder.
   15. means for injecting said metered amounts of oxygen into said cylinder after closing of the exhaust valve and prior to the piston reaching top dead center, and while relatively low pressures exist in the cylinder;
   16. means for injecting said metered amounts of fuel into said cylinder under high pressure, after the injection of oxygen, such that the fuel burns progressively as it is injected;
   17. means for injecting said metered amounts of water into said cylinder only during the exhaust stroke to cool the cylinder wall, piston, dome, combustion chamber wall, and exhaust gas without causing substantial cooling of the hot gas during combustion and expansion of the gas; and
   18. means for igniting the injected mixture of fuel and oxygen to produce combustion.

13. The engine of claim 12 wherein said means for recovering water from said exhaust comprises a desuperheater, a condenser, said condenser including coils and means for circulating a coolant through said coils, means for spraying water in said desuperheater and means for delivering water discharged from said condenser to said water spray means in said desuperheater.

14. The engine of claim 13 wherein said means for recovering water from said exhaust further includes a reservoir, means for discharging exhaust and condensate, including water sprayed into said desuperheater, from said desuperheater into said condenser, means for discharging exhaust and condensate, including sprayed water, from said condenser into said reservoir and means for feeding water from said reservoir to said water spray means in said desuperheater and to said water spray injector in said cylinder.

15. The engine of claim 12 wherein said oxygen storage means comprises a plurality of interconnected storage tanks of high pressure oxygen gas.

16. The engine of claim 15 wherein said fuel is hydrogen and wherein said fuel storage means comprises a plurality of interconnected storage tanks of high pressure hydrogen gas.

17. The engine of claim 12 wherein said oxygen storage means comprises a plurality of interconnected insulated storage tanks containing therein liquid oxygen and further including means for vaporizing said liquid oxygen, said means for vaporizing disposed between said tanks and said oxygen injector.

18. The engine of claim 17 wherein said fuel is hydrogen and wherein said fuel storage means comprises a plurality of interconnected storage tanks of high pressure hydrogen gas.

19. The engine of claim 12 wherein said fuel is a liquid hydrocarbon.

20. The engine of claim 19 wherein said oxygen storage means comprises a plurality of interconnected storage tanks of high pressure oxygen gas.

21. The engine of claim 19 wherein said oxygen storage means comprises a plurality of interconnected insulated storage tanks containing therein liquid oxygen and further including means for vaporizing said liquid oxygen, Said means for vaporizing disposed between said tanks and said oxygen injector.

22. A method for operating an internal combustion engine having at least one cylinder, a piston reciprocating in said cylinder, an exhaust port in said cylinder and an exhaust valve in said port, means for injecting fuel, substantially pure oxygen and water into said cylinder, means for supplying said fuel, oxygen and water in metered amounts to said injecting means, means for igniting the injected mixture of fuel and oxygen to produce combustion, and means for cyclically opening and closing said exhaust valve, which comprises the cycle of:
 a. closing said exhaust valve prior to completion of the exhaust stroke to entrain a limited amount of exhaust gas in the cylinder as a working fluid;
 b. injecting a metered amount of substantially pure oxygen gas into the cylinder after the exhaust valve closes and prior to the piston reaching top dead center on its exhaust stroke, said oxygen injection occurring while relatively low pressures exist in the cylinder, and said amount of oxygen injected being at least a stoichiometric quantity;
 c. injecting a metered amount of fuel into the cylinder under high pressure, after injection of the oxygen, so that the fuel burns progressively as it is injected;
 d. combusting the mixture of oxygen and fuel injected into the cylinder;
 e. opening said exhaust valve after said fuel and oxygen are combusted and discharging the exhaust gas from said cylinder; and
 f. injecting a metered amount of water spray into said cylinder only during the exhaust stroke, while said exhaust valve is open, to cool the cylinder wall, piston, dome, combustion chamber wall and exhaust gas by vaporization of the water without causing substantial cooling of the hot gas during combustion and expansion.

23. The method of claim 22 wherein said fuel is hydrogen gas.

24. The method of claim 22 wherein said fuel is a liquid hydrocarbon.

25. The method of claim 24 wherein said liquid hydrocarbon is selected from the group consisting of diesel fuel and gasoline.

26. The method of claim 22 wherein the exhaust valve is closed when the piston has reached a position during the exhaust stroke where about a 5:1 volume ratio remains in said cylinder.

27. The method of claim 22 wherein said relatively low pressure in step (b) is less than about 300 psia.

28. The method of claim 22 wherein said high pressure in step (c) ranges from about 300 to 1,300 psia.

29. The method of claim 22 wherein the amount of oxygen injected represents a 15 percent excess over the stoichiometric requirement.

30. The method of claim 22 wherein a portion of said amount of oxygen is injected prior to said cylinder reaching top dead center of its exhaust stroke and wherein the remaining portion of said amount of oxygen is injected after the cylinder has reached top dead center of its exhaust stroke and has begun its power stroke.

31. The method of claim 22 wherein said fuel is selected from the group consisting of hydrogen, diesel fuel and gasoline; wherein said oxygen is injected, in an amount representing an excess over the stoichiometric requirement, into a cylinder wherein the pressure is less than about 300 psia; and wherein the pressure of the fuel injected into said cylinder is from about 300 to 1,300 psia.

32. The method of claim 31 wherein said exhaust valve is closed when the piston has reached a position during the exhaust stroke where about a 5:1 volume ratio remains in said cylinder.

33. The method of claim 22 wherein the water contained in the exhaust gas discharged from said cylinder through the open exhaust valve is recovered in liquid form from said exhaust gas and injected into said cylinder to cool said cylinder and piston.

34. A method as recited in claim 33 in which a portion of the water recovered from said exhaust gas is injected into said cylinder.

* * * * *

UNITED STATES PATENT OFFICE
CERTIFICATE OF CORRECTION

Patent No. 3,672,341　　　　　Dated June 27, 1972

Inventor(s) Richard D. Smith et al.

It is certified that error appears in the above-identified patent and that said Letters Patent are hereby corrected as shown below:

Col. 1, line 8, "802,941" should be -- 820,941 --;

Col. 2, line 37, after "$H_2O$" insert -- ) --;

Col. 9, line 65, "meanS" should be -- means --;

Col. 10, line 1, "meanS" should be -- means --;

Reference "2,487,126" should be -- 2,487,176 --.

Signed and sealed this 9th day of January 1973.

(SEAL)
Attest:

EDWARD M. FLETCHER, JR.　　　　ROBERT GOTTSCHALK
Attesting Officer　　　　　　　　Commissioner of Patents